UNITED STATES PATENT OFFICE.

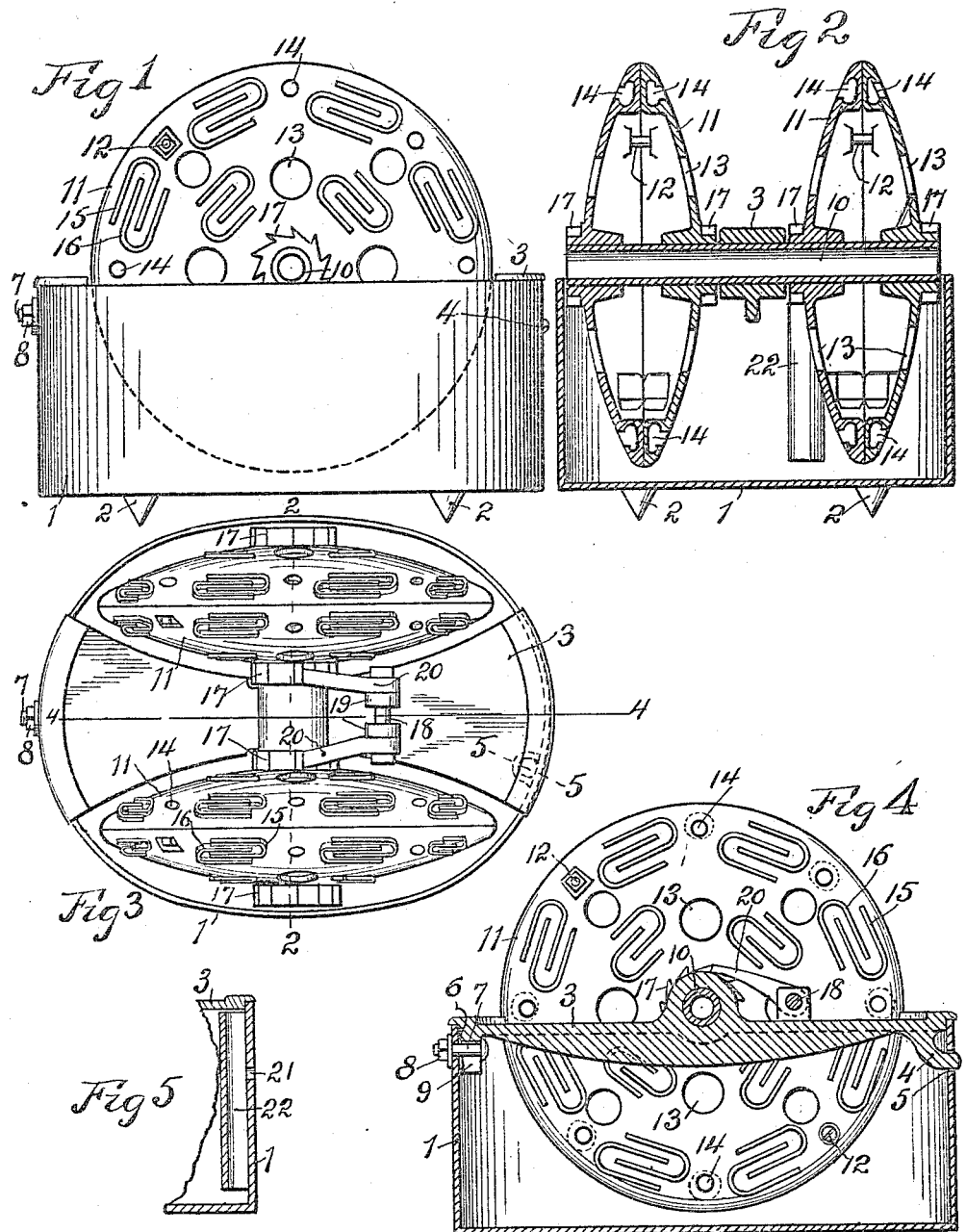

WILLIAM S. SWIFT, OF INDEPENDENCE, MISSOURI.

HOG-OILER.

1,276,591. Specification of Letters Patent. Patented Aug. 20, 1918.

Application filed January 29, 1917. Serial No. 145,085.

*To all whom it may concern:*

Be it known that I, WILLIAM S. SWIFT, a citizen of the United States, residing at Independence, in the county of Jackson and State of Missouri, have invented a certain new and useful Improvement in Hog-Oilers, of which the following is a specification.

My invention relates to improvements in hog oilers.

The object of my invention is to provide a hog oiler which is adapted to withstand rough usage, which is simple in construction, cheap to manufacture and efficient in operation.

My invention provides further a novel rubbing wheel which is adapted to be rotated by and thoroughly oil the body of an animal, such as a hog.

My invention provides further a rotary rubbing wheel provided with novel means for picking up and discharging oil during its rotation.

My invention provides still further means, preferably releasable, by which the rubbing wheel is held from rotation in one direction, but permitted to rotate in the opposite direction, whereby the animal will be unable to merely oscillate the wheel without effecting its rotation.

My invention provides further novel means for releasably securing the support for the rubbing wheels to the oil tank.

The novel features of my invention are hereinafter fully described and claimed.

In the accompanying drawing which illustrates the preferred embodiment of my invention, Figure 1 is a side elevation of my improved hog oiler.

Fig. 2 is a vertical sectional view of the same on the line 2—2 of Fig. 3.

Fig. 3 is a top view of the same.

Fig. 4 is a vertical sectional view on the line 4—4 of Fig. 3.

Fig. 5 is a fragmental vertical sectional view on the line 5—5 of Fig. 3.

Similar reference characters designate similar parts in the different views.

1 designates an open top tank having vertical side walls and preferably, provided on its bottom with pointed conical projections 2 adapted to enter the ground for the purpose of preventing the tank from slipping.

A horizontal plate 3 is adapted to extend diametrically across and to rest upon the upper edge of the tank 1. The under side of the plate 3 is provided with an outwardly extending curved arm 4 which is adapted to be extended through a hole 5 provided in the side wall of the tank 1. The side wall of the tank is provided diametrically opposite the hole 5 with a hole 6 through which extends a horizontal bolt 7 provided on its outer side with a nut 8 and which is adapted to pass between two downwardly extending arms 9 on the under side of the plate 3. By tightening the nut 8, the plate 3 may be rigidly held in operative position. By loosening the nut 8, the plate 3 may have the end adjacent to the bolt 7 swung upwardly out of the tank 1, thereby releasing the arm 3 from the tank, whereupon the plate and the parts it carries may be removed from the tank, so that the latter may be cleaned.

Mounted transversely on the plate 3 is a wheel supporting device preferably comprising a horizontal tube 10, upon which two wheels 11 are rotatably mounted, independently of each other. The wheels 11 are preferably hollow and preferably comprise two curved plates secured together by bolts 12 and having their convex sides disposed outwardly. Said sides are preferably provided with holes 13 through which oil from the tank 1 may enter the rubbing wheels 11 and through which the oil, on the rotation of the wheels, may again pass outwardly upon the outer sides of the rubbing wheels, so that a hog rubbing against the wheels may have its body oiled.

Each wheel 11 is provided on opposite sides with a plurality of pockets 14 adapted to receive oil from the tank 1 and to discharge the same upon the outer adjacent sides of the wheel.

The pockets 14 are disposed preferably adjacent to the periphery of each wheel 11 and have their mouths disposed at the lower sides of said pockets, when the pockets are at the uppermost position.

The outer side of each wheel 11 is preferably provided with two sets of U-shaped buckets 15 and 16, the buckets 15 facing in one direction and the buckets 16 facing in the opposite direction with respect to the plane of rotation of the wheel. Preferably one set of arms of one set of buckets are disposed, as shown in the drawing, extending between the arms of the other set of buckets. By this arrangement of the buckets 15 and 16, the oil is picked up and thoroughly distributed over the sides of the rubbing wheel.

A hog, or other animal, using the oiler, will either rub against the sides of the wheels or will straddle the wheels or stand between them during the rubbing operation. In order that the wheels will be fully rotated and not merely oscillated, in the rubbing operation, I provide means for holding the wheels from turning in one direction, but permitting them to rotate in the opposite direction. In the form illustrated, the hub of each wheel is provided with two sets of ratchet teeth 17 disposed respectively at opposite sides of the wheel 11. Pivoted on a horizontal bolt 18 which is mounted in two lugs 19 on the upper side of the plate 3 are two gravity actuated pawls 20 which respectively engage the ratchet teeth 17 which are at the inner sides of the wheels 11. The pawls 20 engaging the teeth 17 permit the wheels 11 to be rotated in one direction only. By having two sets of ratchet teeth on opposite sides of each wheel respectively, the wheels may be reversed in position, the disposition of the ratchet teeth being such as will permit of this being done. By this arrangement if the teeth, which are engaged by the pawls should become worn or broken, the wheels may be reversed and the pawls engaged with the other set of ratchet teeth.

By having the pawls 20 pivoted to the wheel support or plate 3, the latter may be detached from the tank with the wheels without at all interfering with the engagement of the latter by the pawls.

To automatically discharge water, which may enter the tank 1, one end of the tank is provided with a discharge hole 21 which is embraced by a vertical semi-tube 22 on the inner wall of the tank, and which extends from near the top thereof to near the bottom thereof. Water entering the tank will sink to the bottom and will be forced by the oil upwardly through the semi-tube 22 and out the hole 21.

I do not limit my invention to the structure shown and described, as modifications, within the scope of the appended claims, may be made without departing from the spirit of my invention.

What I claim is:—

1. In a hog oiler, an oil tank provided in one side with a hole, a bolt extending through the other side of the tank and provided with a nut, a plate adapted to have both ends supported by said tank and having at one end an arm adapted to enter said hole when the plate is so supported, the other end of the plate being provided with two downwardly extending arms adapted to receive between them said bolt and to be releasably clamped by said bolt, and a wheel rotatably mounted on said plate and extending into and above said tank.

2. In a hog oiler, an oil tank, a plate adapted for pivotal connection at one end with one side of said tank and provided at its other end with two downwardly extending arms, releasable means adapted to be received between said arms for releasably clamping the plate to the tank, and a wheel rotatably mounted on said plate and extending into and above said tank.

3. In a hog oiler, an oil tank, a wheel support carried thereby, a rubbing wheel rotatable on said support and extending into said tank and arranged for a reversal of its sides with respect to said support and provided at each side with ratchet teeth, and a pawl pivoted to said support and arranged for operative engagement with the ratchet teeth on the adjacent side of said wheel.

4. In a hog oiler, an oil tank, a support carried thereby, and a wheel rotatably mounted on said support and extending into and above said tank and provided on its opposite outer sides with buckets adapted to pick up and discharge oil over the outer sides of the wheel when the wheel is rotated.

5. In a hog oiler, an oil tank, a support carried thereby, and a wheel rotatably mounted on said support and extending into and above said tank and provided on its opposite outer sides with U-shaped projections forming buckets adapted to pick up and discharge the oil when the wheel is rotated, some of the buckets facing in one direction and others of the buckets facing in the opposite direction with respect to the plane of rotation of the wheel.

6. In a hog oiler, a rotary rubbing wheel having both sides convex and provided with means for picking up oil and discharging the same over both outer sides when the wheel is rotated in oil.

7. In a hog oiler, a rotary hollow rubbing wheel having both sides convex, said sides being provided respectively with transverse holes adapted to receive oil and to discharge the same upon said convex sides, when the wheel is rotated in oil.

8. In a hog oiler, a rotary rubbing wheel having both sides convex, each side near the periphery of the wheel being provided with a plurality of pockets adapted when passed through oil to pick up the same and to discharge the oil over the adjacent outer side of the wheel when the wheel is rotated.

9. In a hog oiler, a rotary rubbing wheel having both sides convex, each side being provided with buckets adapted to pick up oil and to discharge the same over the adjacent side when the wheel is rotated partly immersed in oil.

10. In a hog oiler, a rotary rubbing wheel having a convex side provided with a plurality of U-shaped buckets adapted to pick up oil and discharge the same over said side when the wheel is rotated.

11. In a hog oiler, a rotary rubbing wheel having a convex side provided with two sets of U-shaped buckets adapted to pick up oil and discharge the same over said side, the two sets of buckets facing respectively in opposite directions with respect to the plane of rotation of said wheel.

In testimony whereof I have signed my name to this specification.

WILLIAM S. SWIFT.

Copies of this patent may be obtained for five cents each, by addressing the "Commissioner of Patents, Washington, D. C."